(12) United States Patent
Watson et al.

(10) Patent No.: US 10,838,681 B2
(45) Date of Patent: *Nov. 17, 2020

(54) SCREEN MIRRORING FROM PERSONAL ELECTRONIC DEVICES TO TRANSPORTATION VEHICLE DISPLAY SCREENS

(71) Applicant: Panasonic Avionics Corporation, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 175 days.

This patent is subject to a terminal disclaimer.

(21) Appl. No.: 15/479,538

(22) Filed: Apr. 5, 2017

(65) Prior Publication Data

US 2018/0293043 A1    Oct. 11, 2018

(51) Int. Cl.
*G06F 3/14* (2006.01)
*G09G 5/12* (2006.01)
(Continued)

(52) U.S. Cl.
CPC .......... *G06F 3/1454* (2013.01); *G09G 5/12* (2013.01); *H04W 76/14* (2018.02); *H04W 76/15* (2018.02); *G09G 2354/00* (2013.01); *G09G 2370/022* (2013.01); *G09G 2370/12* (2013.01); *G09G 2370/16* (2013.01); *G09G 2380/12* (2013.01); *H04W 4/80* (2018.02); *H04W 84/12* (2013.01)

(58) Field of Classification Search
USPC ..................... 345/1.1, 2.1, 2.2, 2.3
See application file for complete search history.

(56) References Cited

U.S. PATENT DOCUMENTS 7,624,210 B2    11/2009    Izutsu
7,710,349 B2    5/2010    David De Leon
(Continued)

OTHER PUBLICATIONS

Google, Widevine, DRM Achitecture Overview, Mar. 6, 2017, pp. 1-28, Version 1.2, published online at URL: https://storage.googleapis.com/wvdos/Widevine_DRM_Architecture_Overview.pdf.

*Primary Examiner* — Jason M Mandeville
(74) *Attorney, Agent, or Firm* — Perkins Coie LLP

(57) ABSTRACT

An entertainment system for a vehicle for a vehicle accommodating a passenger with a personal electronic device executing a screen sharing application. The system information processing devices, with each information processing device including a data processor, and one or more of the information processing devices including a display monitor. The system includes a WLAN access point configured to establish a wireless data communications link with the personal electronic device. A screen sharing server executed by the data processor of one of the information processing devices is receptive to a display data stream generated on the portable electronic device based upon a redirected display output and transmitted to the screen sharing server over the wireless data communications link. The display data stream is transmitted following pairing of the screen sharing application with the information processing device including a display monitor, and the received display data stream rendered thereon.

14 Claims, 4 Drawing Sheets

(51) Int. Cl.
*H04W 76/14* (2018.01)
*H04W 76/15* (2018.01)
*H04W 84/12* (2009.01)
*H04W 4/80* (2018.01)

(56) References Cited

U.S. PATENT DOCUMENTS

| | | | |
|---|---|---|---|
| 7,737,915 | B1 | 6/2010 | Vishlitzky |
| 8,190,799 | B2 | 5/2012 | Izutsu |
| 8,527,012 | B2 | 9/2013 | Wright-Riley |
| 8,856,838 | B2 | 10/2014 | Keen et al. |
| 8,879,987 | B1 | 11/2014 | Harold |
| 9,003,454 | B2 | 4/2015 | Keen et al. |
| 9,237,372 | B2 | 1/2016 | Dey |
| 9,348,492 | B1 * | 5/2016 | Penilla ............... B60W 40/08 |
| 9,383,961 | B2 | 7/2016 | Dusterhoff |
| 9,420,314 | B1 | 8/2016 | Dame |
| 9,516,352 | B2 | 12/2016 | Keen et al. |
| 9,584,860 | B2 | 2/2017 | Dey |
| 9,800,670 | B2 | 10/2017 | Warrick et al. |
| 9,848,027 | B2 | 12/2017 | Chen |
| 10,001,916 | B2 | 6/2018 | Bostick et al. |
| 10,015,265 | B2 | 7/2018 | Warrick et al. |
| 2006/0136828 | A1 * | 6/2006 | Asano ............... G06F 3/1454 715/733 |
| 2007/0236482 | A1 | 10/2007 | Proctor et al. |
| 2009/0119721 | A1 * | 5/2009 | Perlman ............... H04N 7/24 725/76 |
| 2012/0188147 | A1 * | 7/2012 | Hosein ............... H04M 1/72519 345/2.2 |
| 2013/0005336 | A1 | 1/2013 | Ayotte et al. |
| 2013/0194510 | A1 | 8/2013 | Freundlich et al. |
| 2014/0242910 | A1 | 8/2014 | Umlauft et al. |
| 2015/0334163 | A1 | 11/2015 | Turner |
| 2015/0373123 | A1 * | 12/2015 | Warrick ............... H04L 67/30 709/228 |
| 2016/0027399 | A1 | 1/2016 | Wilde et al. |
| 2016/0173937 | A1 | 6/2016 | Shih et al. |
| 2016/0191584 | A1 | 6/2016 | Dickow et al. |
| 2016/0309532 | A1 | 10/2016 | Yu et al. |
| 2016/0311348 | A1 | 10/2016 | Watson et al. |
| 2016/0343346 | A1 | 11/2016 | Lee et al. |
| 2016/0378422 | A1 * | 12/2016 | Kenjalkar ............ G06F 3/1423 726/6 |
| 2017/0060518 | A1 * | 3/2017 | Hong ............... G06F 3/0482 |
| 2017/0139661 | A1 * | 5/2017 | Veeramani ............ G01C 19/04 |
| 2017/0182957 | A1 | 6/2017 | Watson et al. |
| 2017/0374114 | A1 | 12/2017 | Feldman et al. |
| 2018/0041559 | A1 | 2/2018 | Chen |
| 2018/0049250 | A1 | 2/2018 | Perng et al. |
| 2018/0197501 | A1 | 7/2018 | Veeramani et al. |
| 2018/0205983 | A1 * | 7/2018 | Lee ............... G06F 3/1454 |
| 2018/0295191 | A1 | 10/2018 | Warrick et al. |
| 2018/0295426 | A1 * | 10/2018 | Chen ............... B64D 11/0015 |
| 2019/0014373 | A1 * | 1/2019 | Shin ............... H04N 21/436 |

\* cited by examiner

SCREEN MIRRORING FROM PERSONAL ELECTRONIC DEVICES TO TRANSPORTATION VEHICLE DISPLAY SCREENS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to entertainment systems for transportation vehicles, and more particularly to screen mirroring from personal electronic display devices to display screens of transportation vehicles.

2. Related Art

Air travel typically involves journeys over extended distances that at the very least take several hours to complete. Some of the longer non-stop international flights have scheduled durations of over sixteen hours with travel distances extending beyond ten thousand miles. Passengers on board the aircraft are confined within an enclosed space of a designated seat for the entire duration of the flight, with only a few limited opportunities to leave the seat for use of the lavatory and so forth. Thus, even on the shortest trips an airline passenger has some idle time, which the passenger may occupy with work, leisure, and/or rest.

Airlines therefore provide onboard in-flight entertainment and communications (IFEC) systems that offer a wide variety of multimedia content for passenger enjoyment. Recently released movies are a popular viewing choice, as are television shows such as news programs, situation and stand-up comedies, documentaries, and so on. Useful information about the destination such as airport disembarking procedures, immigration and custom procedures and the like are also frequently presented. Audio-only programming is also available, typically comprised of playlists of songs fitting into a common theme or genre. Likewise, video-only content such as flight progress mapping, flight status displays, and so forth are available. Many in-flight entertainment systems also include video games that may be played by the passenger.

The specific installation may vary depending on service class, though in general, each passenger seat is equipped with a display device, an audio output modality, an input modality, and a terminal unit. The terminal unit may generate video and audio signals, receive inputs from the input modality, and execute pre-programmed instructions in response thereto. The display device is typically an LCD screen that is installed on the seatback of the row in front of the passenger, though in some cases it may be mounted to a bulkhead or retractable arm, or the like, that is in turn mounted to the passenger's seat. Furthermore, the audio output modality is a headphone jack, to which a headphone, either supplied by the airline or by the passenger, may be connected.

The multimedia content is encoded and stored as digital data, with a video decoder and audio decoder of the terminal unit functioning to generate the aforementioned video and audio signals therefrom. It is desirable to have a wide range of different multimedia content to satisfy the varying tastes of passengers. It is also desirable to have a sufficient volume of multimedia content so that passengers can remain occupied with entertainment for the entire duration of the flight. This data may be stored on a central content server, with each terminal unit including networking modalities such as Ethernet to establish a data communications link to the central content server. Following retrieval, the multimedia content data is decoded and presented on the display device.

Notwithstanding the availability of airline-installed IFEC equipment such as the aforementioned seatback display screens and headphone jacks, an increasing number of passengers are choosing to bring on board their own portable electronic devices (PEDs) such as smart phones, media players, electronic readers, tablets, laptop computers, and so forth. In most cases, these devices are loaded with music, video, games, and other multimedia content of the user's choosing well before embarking. Although passengers are increasingly relying upon the PED itself to view video content (and thereby circumventing the aircraft-installed IFEC system entirely), the display area, particularly with smaller form factor devices such as smartphones and "phablet" type devices, tends to be smaller than the display devices of the newer IFEC system installations. Thus, in addition to sharing multimedia content from the IFEC system to the PEDs, there are use cases in which multimedia content stored on the PEDs are presented on the display devices of the IFEC system.

Fundamentally, PEDs function as mass storage devices that may be connected via a standard physical and logical interface such as Universal Serial Bus (USB). Popular, albeit proprietary physical interfaces such as the Apple® 30-pin connector, as well as standardized analog (composite) and digital (High Definition Multimedia Interface/HDMI) video connectors have also been provided on the passenger terminal unit. However, providing the correct cable for the myriad of possible passenger PEDs is problematic, and not all PEDs can be interconnected.

Although available data transfer bandwidth may be greater on wired solutions, wireless solutions based upon Wi-Fi and/or Bluetooth modalities have also been proposed. However, even to the extent universally compatible data transfer links between the passenger PED and the IFEC system can be provided, the terminal unit and/or of the IFEC system must have the appropriate media codec (coder/decoder) software in order to replay the external multimedia content. Although some level of standardization exists with video formats, each device or device platform (e.g., Apple iOS, Android, Windows, etc.) may utilize different formats. Due to the complex licensing issues with mobile video delivery, users may choose to encode video data using alternative, unrestricted formats. Thus, at any given time, different passenger PEDs may store multimedia content in accordance with a variety of formats, all of which must be accommodated by the IFEC system. Moreover, the video rendering technology, along with the codecs necessary to support the same, is ever-changing, and continually updating the IFEC system for new formats remains challenging.

In the transportation vehicle context, family members and friends travelling together may be seated in consecutive seats, and may desire to view multimedia programming together. The default assumption, however, is that any given passenger desires privacy and isolation from the adjacently seated passenger, and display devices typically include privacy screens that limit visibility for off-angle viewing.

Accordingly, there is a need in the art for improvements to the display of multimedia content stored on passenger PEDs to IFEC systems, particularly those that that are universal across various video codecs and file formats. There is also a need in the art for extending the display to other content, including games, text on e-readers, and the like, and also mirroring the multimedia content across multiple display devices.

BRIEF SUMMARY

The present disclosure is directed to wirelessly sharing display data streams such as playing multimedia content from a passenger portable electronic device (PED) to a seat back display, otherwise referred to herein as a display monitor. The system contemplates passengers being able to view media stored on their PED, rather than forcing the passenger to watch the media on the limited display screen of the PED. It is expressly envisioned that watching the multimedia content on the seat back display is more convenient than requiring the PED to be held for extended durations in potentially awkward positions. The multimedia content may also be shared with travel companions such as the case with passengers travelling with small children who has brought along a copy of the programs favored by such children. Thus, forwarding the screen case from one display monitor to another is contemplated.

One embodiment contemplates an entertainment system for a vehicle accommodating a passenger with a personal electronic device running or executing a screen sharing application. The entertainment system includes information processing devices, with each information processing device including a data processor, and at least one of the information processing devices comprising a display monitor. The entertainment system also includes a WLAN access point configured to establish a wireless data communications link with the personal electronic device. A screen sharing server executed by the data processor of one of the information processing devices is receptive to a display data stream generated on the portable electronic device based upon a redirected display output and transmitted to the screen sharing server over the wireless data communications link. In particular, the display data stream is transmitted following pairing of the screen sharing application with the information processing device comprising a display monitor, with the received display data stream rendered on that information processing device, i.e., the information processing device comprising a display monitor.

According to another embodiment, a display monitor system for sharing a display of a personal electronic device is contemplated. The display monitor system may include a data processor, a display device, and a wireless network interface controller for establishing a first wireless communications link with the personal electronic device. The display monitor system may include a pairing module that is executed by the data processor, and is in communication with a corresponding pairing module of the personal electronic device. A pairing may be established with the personal electronic device upon an exchange of a pairing request and a confirmation response. There may also be a display module that is in communication with a display transmitter of the personal electronic device based upon the established pairing. A display data stream that is generated by a display capture module thereof may be transmitted from the display transmitter to the display module over the first wireless communications link. The received display data stream may be rendered on the display device.

In yet another embodiment, a method for sharing a display from a personal electronic device to one or more display monitors installed in a vehicle is disclosed. The method may include transmitting a request from the personal electronic device to pair the personal electronic device with a first one of the one or more display monitors over a wireless communications link. Thereafter, there may be a step of validating the request to pair the personal electronic device with the first one of the one or more display monitors, and establishing a pairing relationship between the personal electronic device and the first one of the one or more display monitors in response to successful validation of the request. The method may also include capturing or producing a display data stream from the personal electronic device, as well as transmitting the captured display data stream over the wireless communications link from the personal electronic device to the first one of the one or more display monitors with which the personal electronic device is paired. Validation of the request may be on the display monitor or an IFEC server. Moreover, the transmitting of the display data stream may be first to the IFEC server and then to the display monitor.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure is directed to display sharing between personal electronic devices (PEDs) and vehicle entertainment systems such as an in-flight entertainment for an aircraft. The detailed description set forth below in connection with the appended drawings is intended as a description of the presently preferred embodiments of the system, and is not intended to represent the only form in which it can be developed or utilized. The description sets forth the features of the system in connection with the illustrated embodiments. It is to be understood, however, that the same or equivalent functions may be accomplished by different embodiments that are also intended to be encompassed with the present disclosure. It is further understood that the use of relational terms such as first, second, and the like are used solely to distinguish one from another entity without necessarily requiring or implying any actual such order or relationship between such entities.

Figure 1:
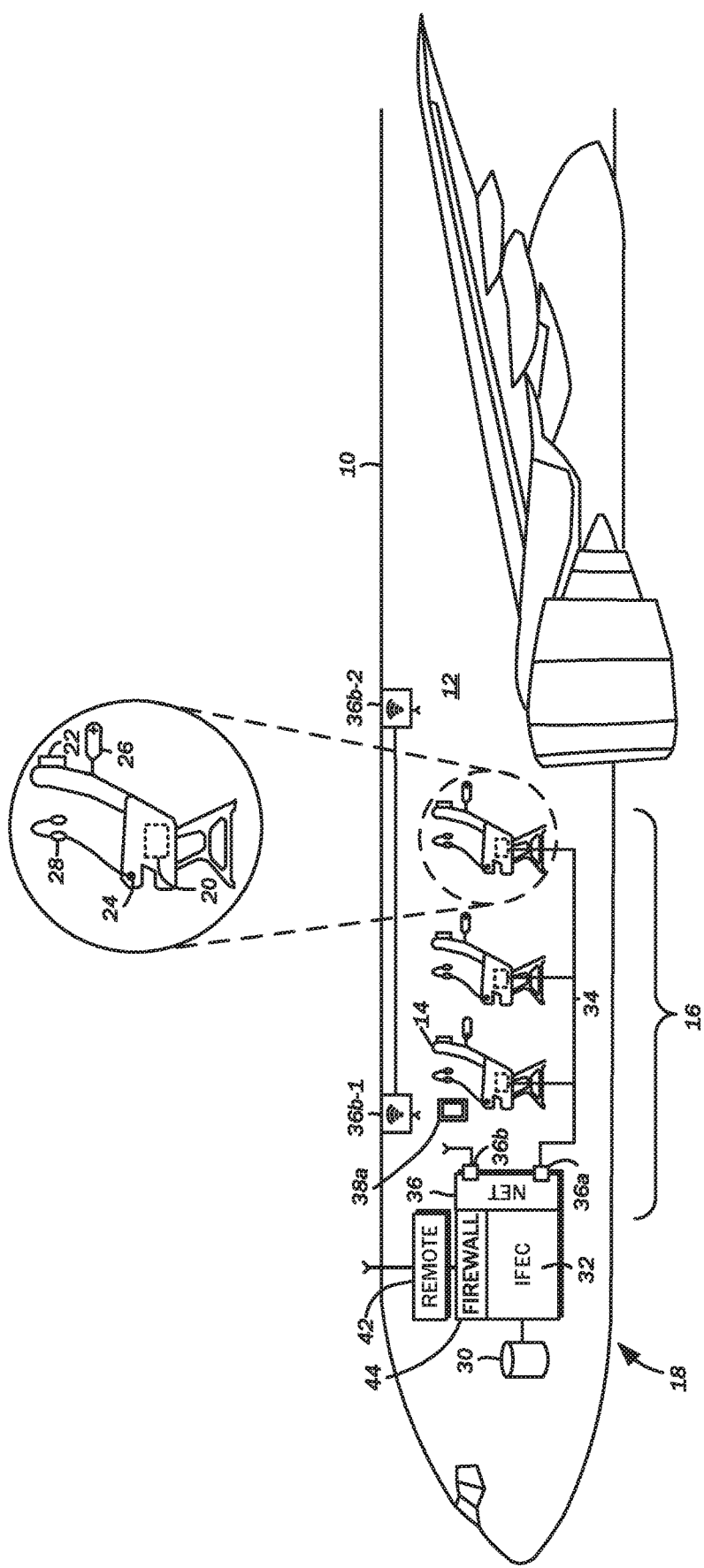
FIG. 1 is a diagram of an exemplary aircraft environment in which one aspect of the presently disclosed system for display sharing may be utilized.

The diagram of FIG. 1 depicts an exemplary aircraft 10 in which various embodiments of the presently disclosed display sharing system may be implemented. Within a fuselage 12 of the aircraft 10 there are seats 14 arranged over multiple rows 16, with each seat 14 accommodating a single passenger. Although the features of the present disclosure will be described in the context of the passenger aircraft 10 and amenities therefor, other passenger vehicles such as trains, watercraft, buses, and others utilizing integrated entertainment systems may be substituted.

The aircraft 10 incorporates an in-flight entertainment and communications (IFEC) system 18, through which various entertainment and connectivity services may be provided to passengers while onboard. A typical IFEC system 18 includes individual seat-back modules comprised of a terminal unit 20, a display device 22, an audio output device 24, and a remote controller 26. For a given row 16 of seats 14, the terminal unit 20 and the audio output device 24 are disposed on the seat 14 for which it is provided, but the display device 22 and the remote controller 26 may be disposed on the row 16 in front of the seat 14 to which it is provided. That is, the display device 22 and the remote controller 26 are installed on the seatback of the row in front of the seat. This is by way of example only, and other display device 22 and remote controller 26 mounting and access configurations such as a retractable arm or the like mounted to an armrest of the seat 14 or by mounting on a bulkhead.

The display device 22 is understood to be a conventional liquid crystal display (LCD) screen with a low profile that is suitable for installation on the seatback. Each passenger can utilize an individual headset 28, supplied by either the airline or by the passenger, which provides a more private listening experience. In the illustrated embodiment, the audio output device 24 is a headphone jack that is a standard ring/tip/sleeve socket. The headphone jack may be disposed in proximity to the display device 22 or on the armrest of the seat 14 as shown. The headphone jack may be an active type with noise canceling and including three sockets or a standard audio output without noise canceling. In alternate embodiments, each display device 22 may incorporate a terminal unit 20 to form a display unit referred to in the art as a smart monitor. Such a smart monitor, as well as any combination of hardware and software components that work together to present content to individual passengers, may also be referred to herein as a display monitor.

A common use for the terminal unit 20 installed on the aircraft is the playback of various multimedia content. The terminal unit 20 may be implemented with a general-purpose data processor that decodes the data files corresponding to the multimedia content and generates video and audio signals for the display device 22 and the audio output device 24, respectively. This multimedia content may include movies, television shows, such as news programs, comedy, documentaries, and informational content pertinent to the flight destination. Furthermore, multimedia content may also encompass audio-only programming, as well as interactive games, flight progress mapping, flight status displays, newspapers/magazines readable on the display device 22, and so on. Broadly, multimedia content is intended to refer to any content of varying duration and form that can be presented to the passenger via the display device 22 or the audio output device 24, or a combination thereof.

The data files of the multimedia content may be stored in a database 30 associated with the IFEC system 18. Specifically, the database 30 is connected to and managed by an IFEC server 32, which may be a specifically adapted general purpose computer system configured as a server to provide data in response to requests therefor. Various software modules are understood to be incorporated into the IFEC server 32, including a streaming server that retrieves the multimedia content from the database 30, as well as a cataloging/menu application with which the user interacts to select the desired multimedia content.

The passenger can play games being executed on the terminal unit and otherwise interact with the multimedia content with the remote controller 26. Navigating through the vast multimedia content library and selecting ones for viewing and/or listening is also possible with the remote controller 26, though in some embodiments, a touch-screen display may be provided for a more intuitive interaction with the multimedia content library. In either case, the terminal unit 20 is loaded with a content selection software application that is executed by the data processor and accepts input from the remote controller 26 or other input modality and generates a response on the graphical interface presented on the display device 22.

Each of the terminal units 20 may be connected to the IFEC server 32 over an aircraft local area network 34, one segment of which may preferably be Ethernet. Thus, the IFEC server 32 includes a data communications module 36, and more specifically, an Ethernet data communications module 36a, e.g., an Ethernet switch or router.

One or more passengers may utilize a portable electronic device (PED) 38 during flight. For purposes of the present disclosure, passenger PEDs 38 refer to smart phones, tablet computers, laptop computers, and other like devices that include a general purpose data processor that executes pre-programmed instructions to generate various outputs on a display, with inputs controlling the execution of the instructions. Although these devices are most often brought on board the aircraft 10 by the passengers themselves, carriers may also offer them to the passengers for temporary use.

Almost all conventional PEDs 38 have a WLAN (Wi-Fi) module. In order to provide onboard connectivity, the data communications module 36 of the IFEC server 32 also includes a WLAN access point 36b. The PEDs 38, via the onboard WLAN network, may connect to the IFEC server 32 to access various services offered thereon such as content downloading/viewing, shopping, and so forth.

Typically, a single WLAN access point 36b is insufficient for providing wireless connectivity throughout the cabin, so additional WLAN access points 36b-1 and 36b-2 may be installed at various locations spaced apart from each other. These additional WLAN access points 36b-1 and 36b-2 may be connected to the IFEC server 32 over an Ethernet link that is part of the aforementioned aircraft local area network 34. The local area network interface or data communications module 36 is understood to encompass the hardware components such as the WLAN access point 36b/transceiver and the Ethernet router/switch 36a, as well as the software drivers that interface the hardware components to the other software modules of the IFEC server 32.

The IFEC system 18 may also offer Internet access to the connecting terminal units 20 as well as the PEDs 38 during flight. In this regard, the IFEC server 32 may include a remote communications module 42 that establishes a remote data uplink, which in turn is connected to the Internet. The remote data uplink may be to a satellite, utilizing Ku-band microwave transmissions. Alternative satellite communications systems such as Inmarsat or Iridium may also be utilized. In another embodiment, the remote communications module 42 may be a cellular modem. The terminal unit 20 or the PEDs 38 connect to the IFEC server 32 via the aircraft local area network 34 established by the data communications module 36, which relays the data transmissions to the remote communications module 42. Due to the high costs associated with the communications satellite or cellular networks in roaming mode, carriers may limit data traffic to and from the remote communications module 42 with a firewall 44.

The foregoing arrangement of the IFEC system 18, along with its constituent components, have been presented by way of example only and not of limitation. Those having ordinary skill in the art will recognize that the IFEC system 18 and its functional subparts can be arranged and organized in any number of different configurations. Furthermore, there may be additional components not mentioned herein, and certain functions may be handled by a different subpart or component than that to which the present disclosure attributes.

Figure 2:
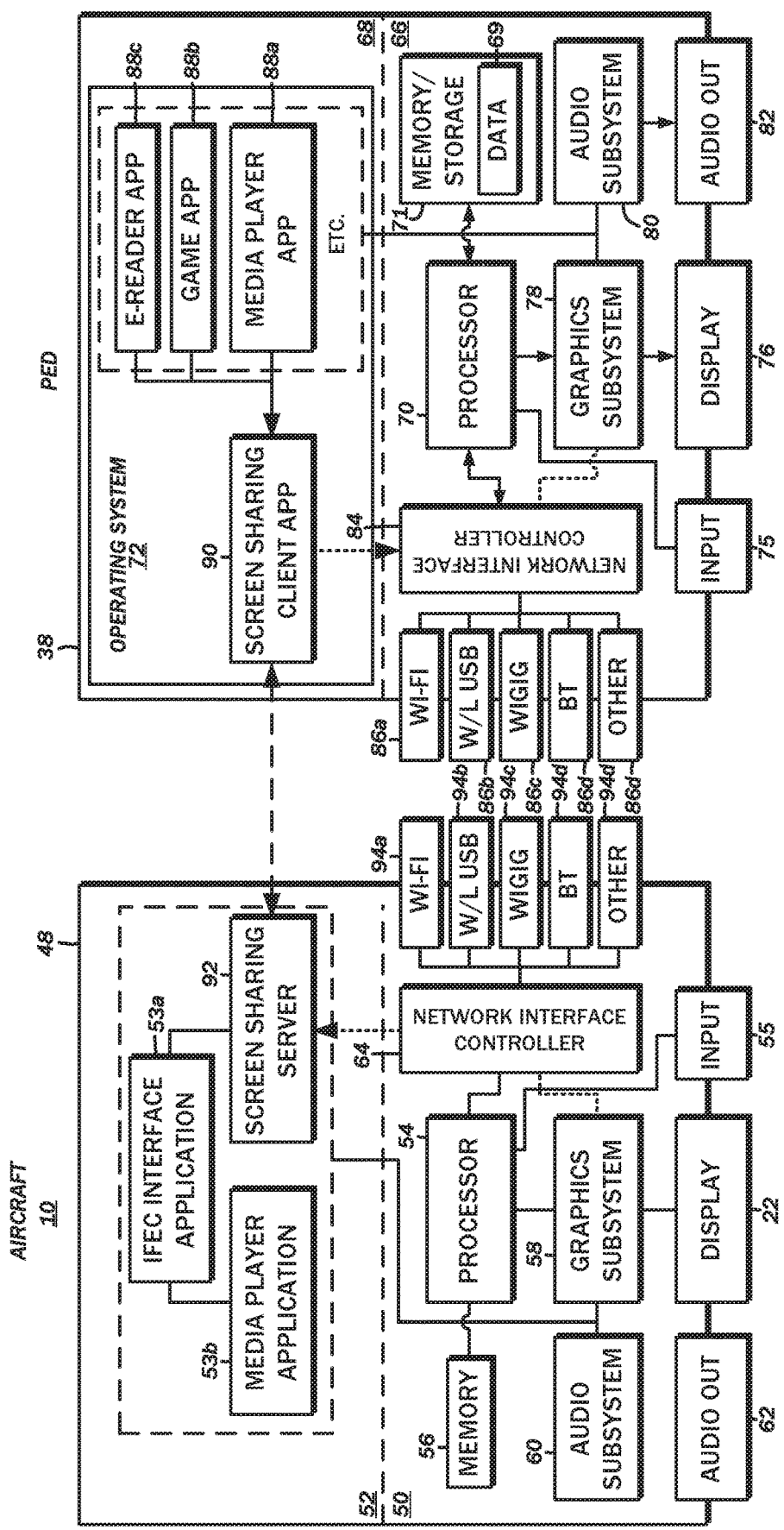
FIG. 2 is a block diagram showing the various components of a first embodiment of a system for display sharing.

Referring now to the block diagram of FIG. 2, various embodiments of the present disclosure contemplate a system 46 for sharing the display of a passenger PED 38 with one or more displays 22 of the IFEC system 18. As indicated above, the combined terminal unit 20 and the display device 22 may be referred to as a display monitor 48, which is also understood to be a part of the IFEC system 18. The display monitor 48 may be generally segregated into various hardware components 50 and software components 52, though this is by way of example only and not of limitation. The functionality of the display monitor 48 described herein may be achieved with components not specified explicitly, and different aspects may be performed by hardware, by software, and/or by a combination thereof.

The software components 52 may comprise a series of pre-programmed instructions that are executed by a central processor 54 and stored in a memory 56. One of the software components 52 may be an IFEC interface application 53a that may provide a graphical user interface to navigate the various features of the IFEC system 18, such as the selection of multimedia content, and accepting playback commands, for example, starting, pausing, stopping, and fast forward/rewinding. A separate media player sub-application 53b invoked via the IFEC interface application 53a may handle such functionality, including the decoding and rendering of the multimedia content. In this regard, the media player sub-application 53b may implement various video codecs that are known in the art. In addition to the media player sub-application 53b, there may be separate sub-applications for games and other functions. Inputs to these applications are provided by the user via one or more input devices 55 such as touch screens, game controllers with a directional input pad, buttons, etc. Those having ordinary skill in the art will recognize the various ways in which such peripheral input devices may be connected to and interface with the display monitor 48, and so the details thereof have been omitted.

An exemplary embodiment of the display monitor 48 may further include a graphics subsystem 58 that further processes the output data from the central processor 54 to generate graphics on the display device 22. Additionally, the display monitor 48 may include an audio subsystem 60 that processes output data from the central processor 54 to generate sound via audio output devices 62, including the aforementioned headphone jack 24 to which the headphones may be connected. Although the example aircraft installation of FIG. 1 shows only the headphone jack 24, the audio output device 62 may include others such as speakers and the like.

The terminal unit 20, and hence the display monitor 48, also includes various data networking modalities, specifically a networking interface controller 64 that provides the physical layer interface and the data link layer interface between the central processor 54 and the network connection to a remote network node. In one context, the remote network node is the IFEC server 32, though in accordance with the various embodiments of the present disclosure, the remote network node may also be the passenger PED 38. That is, a data communications link may be established between a given seatback display monitor 48 for one passenger, and the PED 38 being used by such passenger. In one contemplated embodiment, as will be described in further detail below, the screen display of such PED 38 may be duplicated on the display monitor 48 over a data communications link established between the PED 38 and the display monitor 48.

The PED 38, as a general purpose computing device similar to the display monitor 48, is understood to have much of the same components. These may likewise be segregated into hardware components 66 and software components 68, though, again, the illustrated segregation of components and the functionality performed thereby are presented by way of example only. The functions are controlled by a central processor 70 that executes sequences of pre-programmed instructions corresponding to the software components 68. These instructions and other data 69 may be stored in a memory 71. Typical consumer PEDs 38 are built upon an operating system 72 that controls and provides an interface to the hardware components 66 from various software applications 74. Additionally, the operating system 72 may include a common graphical user interface generated on a display device 76 for invoking the functionality provided by such software applications 74. Inputs to manipulate the various graphical user interface elements may be provided via an input device 75, which is typically a touch panel. PEDs 38 are understood to include additional peripheral inputs such as a physical home button, volume buttons, and power buttons. The hardware components 66, together with the operating system 72 may be referred to as an operating platform, and examples of those currently available for PEDs 38 include the Apple iOS platform, the Google Android platform, and the Windows Mobile platform.

The output of the central processor 70 is displayed on the display device 76, and there may be an additional graphics subsystem 78 or video controller that processes the high-level graphics data into video signals that are passed to the display device 76 for output. A variety of video interfaces are known in the art, including Digital Visual Interface (DVI), High Definition Multimedia Interface (HDMI), DisplayPort, Video Graphics Array (VGA), and others.

Audio output may also be generated by the PED 38, and to this end, there is understood to be an audio subsystem 80 that processes the digital audio data to analog audio signals, which are passed to an audio output device 82. The audio output device 82 may include loudspeakers, as well as audio jacks to which personal headphones and the like may be connected. Conventional PEDs 38 may also have Bluetooth audio features, in which case the digital audio data is not processed to an analog signal by the audio subsystem, but instead passed to a Bluetooth transmitter.

Along these lines, the PED 38 is commonly used in applications requiring data connectivity such as e-mail and messaging, Internet browsing, video streaming, and the like. Thus, the PED 38 includes a network interface controller 84 that establishes the physical layer and data link layer connections to a counterpart remote network node. As the PED 38 is used untethered most often, the networking modalities implemented therein are likewise wireless, such as Wi-Fi and Bluetooth. To this end, there may be additional data networking submodules. In the exemplary embodiment illustrated in FIG. 2, there may be a Wi-Fi submodule 86*a*, a WiGig submodule 86*b*, a Wireless USB submodule 86*c*, and a Bluetooth submodule 86*d*. These submodules are presented by way of example only, and not all such submodules may be included in every PED 38. There may also be additional other wireless or wired networking submodules 86*e*.

Additional functionality beyond that which is provided in the operating platform of the PED 38 is available via various apps. For example, a media player app 88*a*, a gaming app 88*b*, and an e-reader app 88*c*, though other apps that generate graphic and/or audio outputs are also possible. The graphic and audio outputs from each of these apps 88 are generated by the central processor 70 and provided to the graphics subsystem 78 and the audio subsystem 80, respectively. In accordance with various embodiments of the present disclosure, video/display data as would otherwise be output to the display device 76, and audio data as would otherwise be output to the audio output device 82, are transmitted to the display monitor 48 for output on its respective display device 22, and audio output device 62. The output from the apps 74 may be passed to a screen sharing client app 90, which communicates with a counterpart screen sharing server 92 running on the display monitor 48 to transmit a display data stream and an audio data stream thereto.

In one embodiment, the display data stream (and the audio data stream, to the extent applicable) may be digital data corresponding to one of the standard video interfaces, and the transmission thereof may be in accordance with a "screen casting" modality known in the art. Several such modalities rely upon Wi-Fi, and so the display monitor 48 is understood to incorporate a Wi-Fi submodule 94*a*. One screen casting modality is Google Chromecast, which is available on the Android operating platform, and another is Apple AirPlay. Both of these modalities operate based upon the assumption that the originating device is on the same Wi-Fi network as the receiving display, and so the user of the PED 38 may be instructed to join the existing onboard wireless network, or in the alternative, to join a separate peer-to-peer network established only by the particular display monitor 48.

Another screen casting modality is Miracast, which is available on the Windows Mobile operating platform. Miracast utilizes the peer-to-peer Wi-Fi Direct standard, and contemplates wireless video transmissions up to 1080p (High Definition) utilizing the H.264 codec and 5.1 surround sound. Advance Audio Coding (AAC) and AC-3 are understood to be optional codecs, while the mandated codec employs linear pulse-code modulation and audio data being represented with 16 bits at a 48 kHz sampling rate in two channels. The peer-to-peer wireless connection is established with Wi-Fi Protected Setup (WPS) and secured with Wi-Fi Protected Access 2 (WPA2). The Internet layer communications rely upon the IPv4 protocol, and transport layer communications utilize either TCP (transportation control protocol) or UDP (user datagram protocol). Furthermore, at the application layer, the data stream is initiated and controlled with RTSP (Real Time Streaming Protocol), and RTP (Real Time Transport Protocol) for data transfers.

Alternatively, Wireless USB may be utilized for transferring video and audio stream data from the PED 38 to the display monitor 48, and so the display monitor 48 may include a Wireless USB submodule 94*b*. As understood, Wireless USB is based upon the now defunct WiMedia Alliance Ultra Wideband (UWB) common radio platform capable of transmitting data at 480 Mbit/s over distances up to 9.8 ft or 3 meters, and at 110 Mbit/s over distances up to 33 ft or 10 meters. The operating frequency of Wireless USB is in the 3.1 GHz to 10.6 GHz range, but availability may depend on local regulatory policies and which frequency bands are open for unrestricted use.

Still another wireless display sharing modality is based upon WiGig in the unlicensed 60 GHz operating frequency range and the Wireless DisplayPort standard. Thus, the display monitor 48 may include a WiGig submodule 94*c* that communicates with the corresponding WiGig submodule 86*b* of the PED 38. The WiGig specification permits data transmission at multi-gigabit speeds and thus enables high performance wireless data, display, and audio applications. Tri-band enabled devices that operate at the 2.4 GHz, 5 GHz, and 60 GHz bands are contemplated to deliver data transfer rates up to 7 Gbit/s, which is equivalent in speed to an eight-band 802.11ac transmission and more than eleven times faster than the highest 802.11n rate, while maintaining compatibility with existing Wi-Fi devices. Further, WirelessHD, also referred to as UltraGig, which is based upon a 7 GHz channel in the 60 GHz operating frequency band, may also be utilized.

Bluetooth Alternate MAC/PHY, which refers to the transport link utilized in Bluetooth High Speed, may also be utilized to establish the initial communications link between the PED 38 and the display monitor 48, followed by wide bandwidth transmissions over the various Wi-Fi-based wireless networking modalities discussed above. In this regard, the display monitor 48 may include a Bluetooth submodule 94*d*.

Although various exemplary screen casting modalities are referenced herein, these are presented by way of example only and not of limitation. Any other suitable modality may be readily substituted without departing from the scope of the present disclosure.

Figure 3:
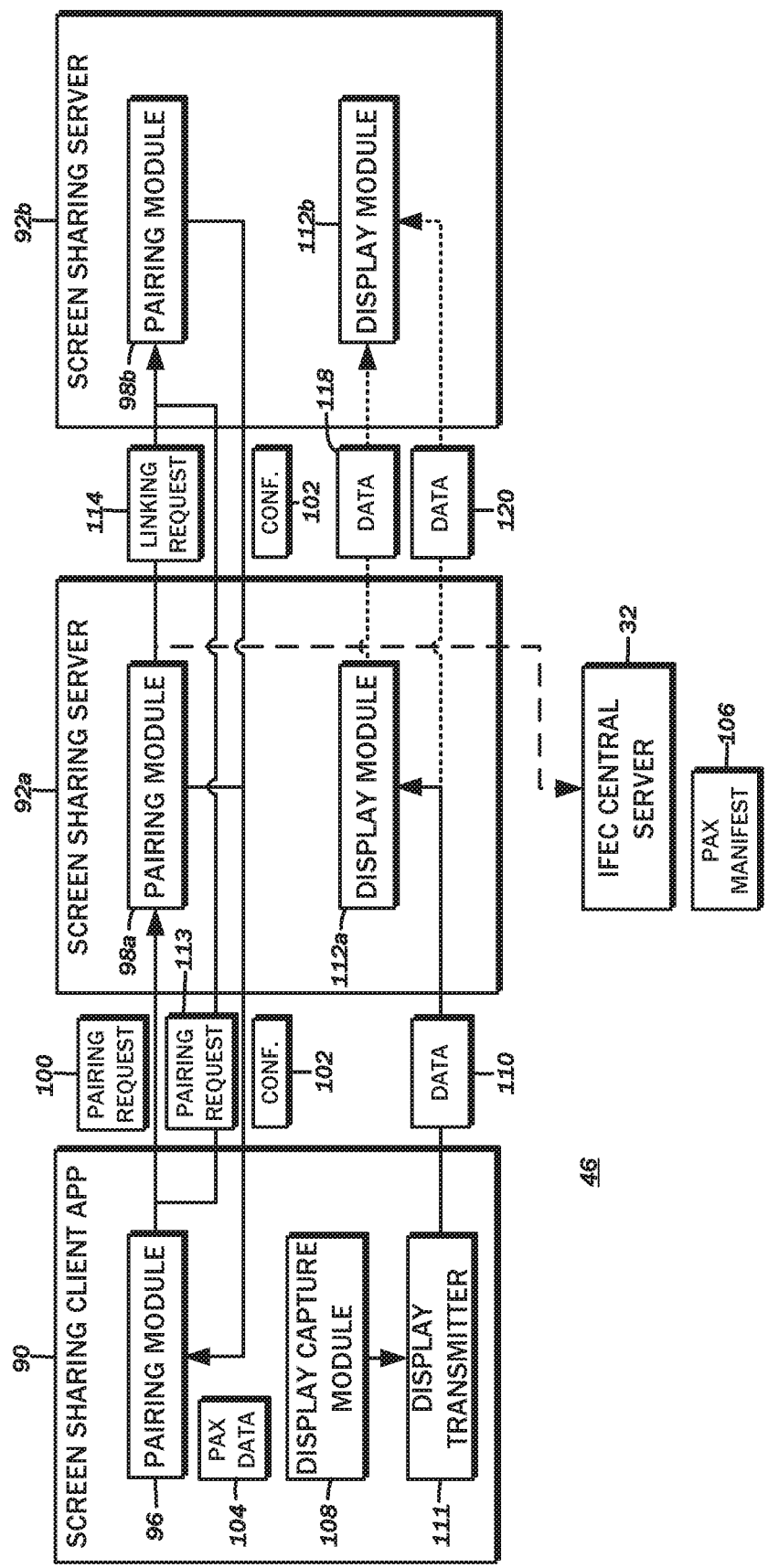
FIG. 3 is a detailed block diagram of the system for display sharing.

Referring to the block diagram of FIG. 3, the system 46 for display sharing will now be considered in terms of the functional inter-relationships between the screen sharing client app 90 and one or more screen sharing servers 92. In this exemplary illustration a first screen sharing server 92*a* is understood to be running on a first one of multiple display monitors 48 installed within the aircraft. There is also a second screen sharing server 92*b* that is running on a second one of the multiple display monitors 48. By way of example, the first one of the display monitors 48 is associated with a first passenger seat 14, while the second one of the display monitors 48 is associated with an adjacent second passenger seat 14 in the same row 16. This example is not intended to be limiting, however, as the system 46 can be extended to other display monitors 48 installed within the aircraft 10.

The screen sharing client app 90 running on the PED 38 may include a pairing module 96 that communicates with a corresponding pairing module 98*a* of the first screen sharing server 92*a*. In one implementation, a paired relationship is established between the pairing module 96 and the pairing module 98*a* following a transmission of a pairing request 100 originating from the PED 38, that is, the pairing module 96, and a confirmation 102 that is returned by the display monitor 48, that is, the pairing module 98*a*. One example pairing procedure is described in applicant's application published as U.S. Pat. App. Pub. No. 2016/0311348 entitled PASSENGER SEAT PAIRING SYSTEM, the entirety of the disclosure of which is hereby incorporated by reference.

It is possible to conduct the pairing process manually, in which the user of the PED 38 initiates the pairing request 100 by invoking this functionality from the screen sharing client app 90. Upon receipt of the pairing request 100 on the first screen sharing server 92*a*, the user may be prompted to confirm the pairing request. Based upon a user input that affirms the pairing request, the pairing module 98*a* may transmit the confirmation 102 back to the pairing module 96 of the screen sharing client app 90.

The pairing process can be conducted automatically as well. Stored on the PED 38, and specifically in a memory space accessible by the screen sharing client app 90 may be passenger data 104 that associates the user of the PED with a particular seat assignment. This information may be transmitted as part of the pairing request 100, and upon receipt, the pairing module 98*a* may query the IFEC server 32 that maintains a passenger manifest 106. After validating the received passenger data 104 against the passenger manifest 106, the confirmation 102 may be transmitted from the pairing module 98*a* to the pairing module 96.

Whether paired manually or automatically, an identifier associated with the first screen sharing server 92*a* or the display monitor 48 on which it is running, is recorded. Transmissions of the display data stream from the PED 38 are then directed to those display monitors 48 thus identified. The screen sharing client app 90 includes a display capture module 108 that processes the video and audio data from the graphics subsystem 78 and the audio subsystem 80 of the PED 38, and generates a display data stream 110 that is transmitted to a corresponding display module 112*a* of the first screen sharing server 92*a* by a display transmitter 111. Although reference is made only to the display data stream 110, it is understood to encompass audio data in addition to the display data. The display may be mirrored as between the PED 38 and the display monitor 48, that is, both the PED 38 and the display monitor show the same content. Optionally, the display device 76 of the PED 38 may be disabled so that only the display monitor 48 is in use. Accordingly, it is no longer necessary for the user to hold the PED 38 at the necessary viewing angle, and the content otherwise displayed on the PED 38 is now visible via the display device 22.

In accordance with another aspect of the present disclosure, display sharing with another display monitor 48 that is running a second instance of the second screen sharing server 92*b* is contemplated. That is, the display of the PED 38 is replicated on two or more additional display monitors 48. This feature may be advantageous where several adjacent passengers such as travelling family members may desire to watch the same multimedia content together. The linking of the second screen sharing server 92*b* may be achieved by the transmission of a display link request 114 from the first screen sharing server 92*a*. The display link request 114 may be generated in response to user input on the first display monitor 38, though it is possible to originate from the pairing module 96/PED 38. The request may specify the seat with which the second screen sharing server 92*b* is associated. For example, the user interface of the first display monitor 48 may accept selections of seats, e.g., "21B, 21C" to which the request is to be sent.

A similar request-confirmation procedure may take place, in which the user is prompted to confirm the linking from the second display monitor 48. For example, this second user may be prompted "21A would like to share movies with you. Do you accept?" Upon answering in the affirmative via the user interface of the second display monitor 48, a confirmation 116 is transmitted back to the pairing module 98*a*, at which point the second pairing/linking relationship is established. A relationship established between the PED 38 and the display monitor 48 may be referred to as the devices being paired, which may be distinguished from a relationship established between multiple display monitors 48 as being linked. Because both display monitors 48 are part of the wired aircraft local area network 34, data transmissions between them may take place thereon. In this configuration, the display data stream 110 received by the display module 112*a* is relayed to the display module 112*b* of the second screen sharing server 92*b* in a forwarded display data stream 118.

The pairing request 113 may be initiated from the pairing module 96 of the PED 38, with the confirmation 116 being transmitted back to the pairing module 96. The display data stream 120 may be relayed from the display module 112*a*, or alternatively, broadcast 120 from the display transmitter 111 of the screen sharing client app 90.

After the respective display modules 112 receive the display data streams 110, 118, or 120, the video/audio data is decoded and output to the display device 22 and the audio output devices 62.

The present disclosure also contemplates various methods for sharing a display of the PED 38 to one or more display monitors 48. With reference to the flowchart of FIG. 4A, the method may begin with a step 200 of transmitting the pairing request, as mentioned above, from the PED 38 and the pairing module 96 thereof, to the display monitor 48. Again, this transmission is understood to take place over a wireless communications link. Thereafter, in a step 210, the pairing request is validated from the display monitor 48. Once validated, a pairing relationship between the PED 38 and the display monitor 48 is established. With the pairing relationship established, the method continues with a step 220 of using the PED 38 to capture or produce a display data stream from the PED 38 with the aforementioned display capture module 108. The display transmitter 111 then transmits this display data stream to the display monitor 48 in a step 230.

Figure 4A:
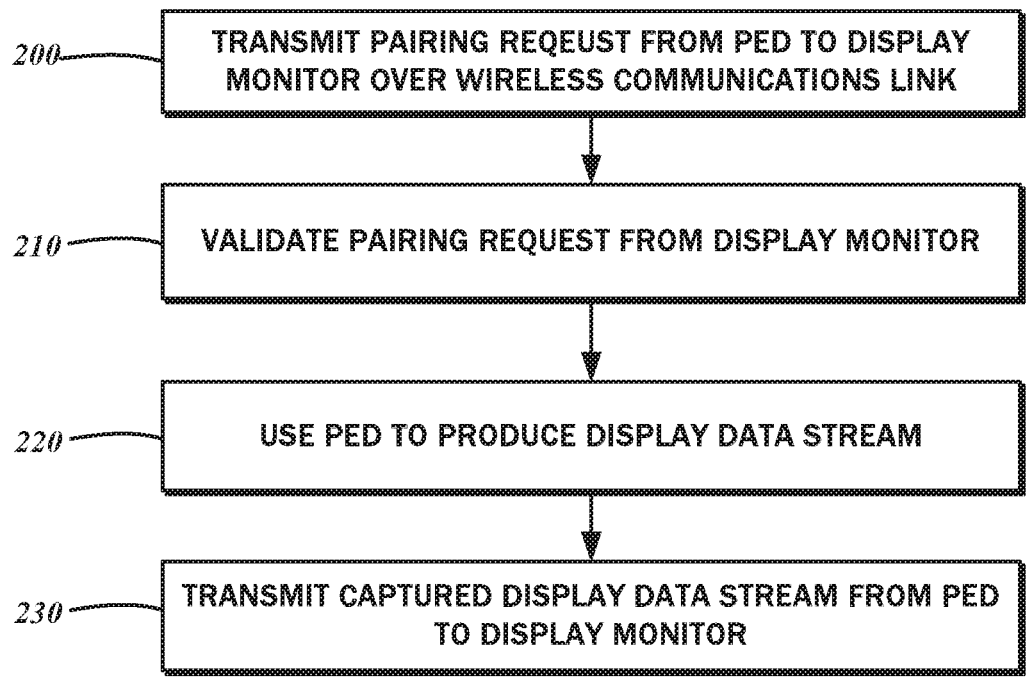
FIG. 4A is a flowchart depicting a first embodiment of a method for sharing a display from a personal electronic device to a display monitor installed in a vehicle.
Figure 4B:
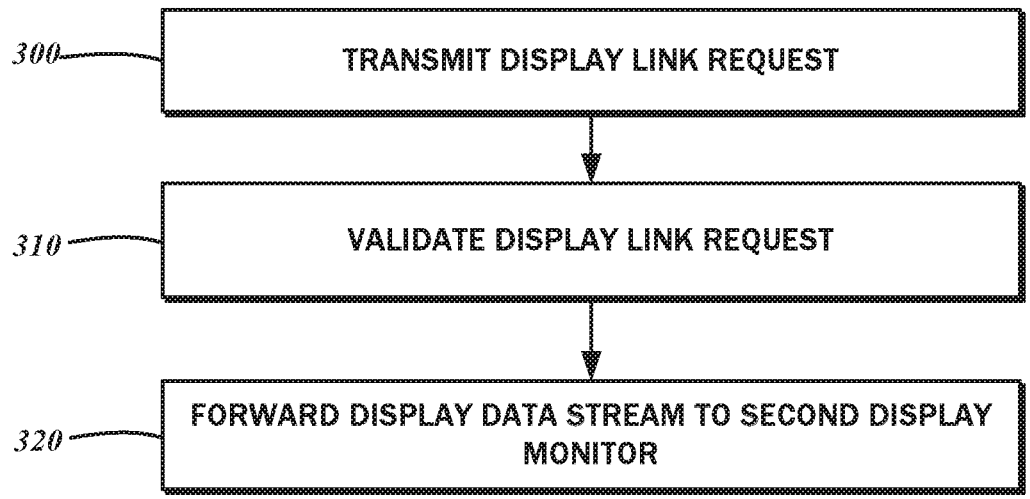
FIG. 4B is a flowchart depicting a second embodiment of the method for sharing the display.

The flowchart of FIG. 4B illustrates an additional embodiment of the method in which a second display monitor 48 is linked. The method continues with a step 300 of transmitting the display link request 114 from the pairing module 98*a* of the first screen sharing server 92*a* to the pairing module 98*b* of the second instance of the second screen sharing server 92*b*. This transmission is understood to take place over a wired communications link. Thereafter, the display link request 114 is validated in a step 310. Upon validation, a linked relationship between the two display monitors 48 is established, and in a step 320, the display data stream 118, 120 is forwarded to the second display monitor 48.

Returning to FIGS. 1 and 3, the wireless link from PED 38 to screen sharing server 92 may alternatively be via a WLAN access point 36*b*-1 or 36-*b*2 to the IFEC server 32, which thereafter communicates the display data to the recipient display monitor or monitors 48. In FIG. 4A, block 230 therefore also includes transmitting a display data stream 110 from a PED 38 indirectly to a display monitor 48 via a WLAN access point 36*b*-1 or 36*b*-2. The communication path of the data stream 110 from the PED 38 in this situation is via a WLAN access point 36-*b*1 or 36-*b*2 to the IFEC server 32, and via a wired connection from the IFEC server 32 to the recipient display monitor 48 (could also be a wireless communication from the IFEC server to the display monitor in alternate configurations). Before a display monitor 48 will show display data 110 from a PED 38, the display monitor software may require entry of an access code. More particularly, the PED 38 from which the display data 110 originates may be presented with the option of entering an access code that the recipient of the display data on a display monitor 48 must enter before the data is displayed by the display monitor 38. This helps to ensure that only intended recipients receive and view the display data 110 from the PED 38.

The particulars shown herein are by way of example and for purposes of illustrative discussion of the various embodiments of the display sharing system only and are presented in the cause of providing of what is believed to be the most useful and readily understood description of the principles and conceptual aspects thereof. In this regard, no attempt is made to show more details than are necessary for a fundamental understanding of the disclosure, the description taken with the drawings making apparent to those skilled in the art how the several forms of the presently disclosed illumination module may be embodied in practice.

What is claimed is:

1. An entertainment system for a vehicle accommodating a passenger with a personal electronic device executing a screen sharing application, the entertainment system comprising:
   information processing devices located in the vehicle,
      wherein each information processing device is associated with a seat, and includes a data processor,
      wherein the information processing devices comprise a first information processing device that comprises a first display monitor and additional information processing devices that each respectively comprise an additional display monitor,
      wherein the first information processing device is located in a first seat adjacent to and on a same row as that of additional seats that each respectively include one of the additional information processing devices;
   a wireless local area network (WLAN) access point located in the vehicle and configured to establish a wireless data communications link with the personal electronic device;
   wherein each of the first information processing device and the additional information processing devices includes a screen sharing server,
   wherein the screen sharing server of each of the first information processing device and the additional information processing devices is receptive to a display data stream generated on the personal electronic device and transmitted to each of the screen sharing servers over the wireless data communications link;
   wherein the display data stream is transmitted to the first information processing device following a pairing of the screen sharing application with the first information processing device;
   wherein the display data stream is replicated to the additional information processing devices to allow several adjacent passengers to watch a same multimedia content after the first information processing device is linked with each of the additional information processing devices that are configured to:
      receive a display link request to link the additional information processing devices with the first information processing device, wherein the display link request specifies that each additional seat is respectively associated with each of the additional information processing devices;
      display, on the additional display monitors and after the display link request is received, a prompt that requests a confirmation of whether the additional display monitors are to be linked to the first display monitor;
      receive, via a user interface of the additional display monitors, an affirmative confirmation that indicates an acceptance of a linking between each of the respective additional display monitors and the first display monitor; and
      send, to the first information processing device, the affirmative confirmation to link the respective additional display monitors with the first display monitor;
   wherein the display data stream is rendered on the first display monitor of the first information processing device and the additional display monitors of each of the additional information processing devices in a manner that mirrors a content displayed on the personal electronic device.

2. The entertainment system of claim 1, wherein the screen sharing server of each of the first information processing device and the additional information processing devices is receptive to an audio data stream generated on the personal electronic device based upon a redirected audio output and transmitted to each screen sharing server over the wireless data communications link, wherein the display data stream and the audio data stream is combined into a single video data stream.

3. The entertainment system of claim 1, wherein the screen sharing application is paired with the screen sharing server of the first information processing device that is configured to:
   receive, from the screen sharing application, a passenger data that relates to the passenger;
   transmit the passenger data to a central server located in the vehicle, wherein the central server is configured to validate the passenger data against a passenger manifest stored on the central server; and
   transmit, to the screen sharing application, a confirmation that pairs the screen sharing application with the screen sharing server of the first information processing device after the passenger data is successfully validated against the passenger manifest.

4. The entertainment system of claim 1, wherein the display of the personal electronic device is disabled while being mirrored on the first display monitor and one or more of each additional display monitor.

5. The entertainment system of claim 1, wherein the display link request is received from the first information processing device.

6. The entertainment system of claim 1, wherein the display data stream rendered on the first display monitor is forwarded to the screen sharing server of each additional information processing device by the screen sharing server of the first information processing device.

7. A first display monitor system located in a first seat in a vehicle for sharing a display of a personal electronic device, the first display monitor system comprising:
   a data processor;
   a first display device;
   a wireless network interface controller for establishing a wireless communications link with the personal electronic device;
   wherein the data processor, upon execution, is configured to:

establish a pairing with the personal electronic device upon an exchange of a pairing request and a confirmation response with the personal electronic device; and receive, in response to the established pairing, a display data stream generated by the personal electronic device over the wireless communications link;

send, to each of a plurality of additional display monitor systems, a display link request to link each of the additional display monitor systems to the first display monitor system, wherein the display link request specifies that additional seats in the vehicle are each respectively associated with one of the additional display monitor systems, and wherein the first display monitor system is located in the first seat adjacent to the additional seats that each respectively include the additional display monitor systems; and receive, from one or more of the additional display monitor systems via a user interface and in response to a displayed prompt, an affirmative confirmation to link a respective additional display monitor system with the first display monitor system, wherein the affirmative confirmation indicates an acceptance of a linking between an additional display device associated with the respective additional display monitor system and the first display device; and wherein the display data stream is rendered on the first display device of the first display monitor system and each linked additional display device of each of the additional display monitor systems to allow several adjacent passengers to watch a same multimedia content in a manner that mirrors a content displayed on the personal electronic device.

8. The display monitor system of claim 7, wherein the pairing between the first display monitor system and the personal electronic device is established by the data processor of the first display monitor system, wherein the data processor is configured to:

display, on the first display device, a query to confirm that the first display monitor system is to be paired with the personal electronic device; and receive, via the first display device and after the query is displayed, the confirmation response that affirms the pairing request.

9. The display monitor system of claim 7, wherein the pairing between the first display monitor system and the personal electronic device is established by the data processor of the first display monitor system, wherein the data processor is configured to:

receive, from the personal electronic device, a passenger data that relates to a passenger;

transmit the passenger data to a central server that stores a passenger manifest, wherein the central server is configured to validate the passenger data against the passenger manifest stored on the central server; and transmit, to the personal electronic device, the confirmation response, wherein the confirmation response is generated based upon an association of the passenger data to the passenger manifest.

10. The display monitor system of claim 7, wherein the display of the personal electronic device is disabled while being mirrored on the first display monitor and each additional display monitor.

11. A method for sharing a display from a personal electronic device to one or more display monitors installed in a vehicle, the method comprising:

establishing, by a first display monitor located in a first seat in the vehicle upon an exchange of a pairing request and a confirmation response, a pairing with the personal electronic device over a wireless communications link;

receiving, by the first display monitor and in response to the established pairing, a display data stream from the personal electronic device over the wireless communications link;

sending, by the first display monitor to each of a plurality of additional display monitors, a display link request to link each of the additional display monitors to the first display monitor, wherein the display link request specifies that additional seats in the vehicle are each respectively associated with one of the additional display monitors, wherein the first display monitor is located in the first seat adjacent to the additional seats that each respectively include the additional display monitors; and receiving, from one or more additional display monitors via a user interface and in response to a displayed prompt, an affirmative confirmation to link the one or more of the additional display monitors with the first display monitor, wherein the affirmative confirmation indicates an acceptance of a linking between a respective additional display monitor and the first display monitor; and wherein the display data stream is rendered on the first display monitor and each linked additional display monitor in a manner that mirrors a content displayed on the personal electronic device.

12. The method of claim 11, wherein the display data stream is forwarded from the first display monitor to an additional display monitor after the affirmative confirmation is received.

13. The method of claim 11, further comprising disabling the display of the personal electronic device while the display of the personal electronic device is mirrored on the first display monitor and each additional display monitor.

14. The method of claim 11, wherein the pairing between the first display monitor and the personal electronic device is established by:

receiving, from the personal electronic device, a passenger data that relates to a passenger;

transmitting the passenger data to a central server that stores a passenger manifest, wherein the central server is configured to validate the passenger data against the passenger manifest stored on the central server; and transmitting, to the personal electronic device, the confirmation response, wherein the confirmation response is generated based upon an association of the passenger data to the passenger manifest.

* * * * *